(12) United States Patent
Suemoto et al.

(10) Patent No.: US 12,539,620 B2
(45) Date of Patent: Feb. 3, 2026

(54) ROBOT CONTROL DEVICE, ROBOT SYSTEM, AND ROBOT CONTROL PROGRAM

(71) Applicant: KAWASAKI JUKOGYO KABUSHIKI KAISHA, Kobe (JP)

(72) Inventors: Hiroki Suemoto, Kobe (JP); Ryusuke Nishikawa, Kobe (JP); Yuki Takayama, Kobe (JP); Toshiyuki Homma, Kobe (JP); Kyo Irie, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 6 days.

(21) Appl. No.: 18/723,679

(22) PCT Filed: Dec. 19, 2022

(86) PCT No.: PCT/JP2022/046675
§ 371 (c)(1),
(2) Date: Jun. 24, 2024

(87) PCT Pub. No.: WO2023/120476
PCT Pub. Date: Jun. 29, 2023

(65) Prior Publication Data
US 2025/0065512 A1 Feb. 27, 2025

(30) Foreign Application Priority Data
Dec. 24, 2021 (JP) .................. 2021-210293

(51) Int. Cl.
*B25J 13/08* (2006.01)
*B25J 15/08* (2006.01)

(52) U.S. Cl.
CPC ............. *B25J 13/085* (2013.01); *B25J 15/08* (2013.01)

(58) Field of Classification Search
CPC ........ B25J 13/085; B25J 15/08; B25J 9/1612; B25J 9/1633; B25J 13/08;
(Continued)

(56) References Cited

U.S. PATENT DOCUMENTS 8,272,243 B2 * 9/2012 Hasegawa ............ B21D 39/021
72/220
8,340,514 B2 * 12/2012 Kusatsugu ........... G03B 11/043
359/511

(Continued)

FOREIGN PATENT DOCUMENTS

| JP | H07-098314 B2 | 10/1995 |
| JP | 2019-038079 A | 3/2019 |
| JP | 2021-084210 A | 6/2021 |

*Primary Examiner* — Jaime Figueroa
(74) *Attorney, Agent, or Firm* — Oliff PLC

(57) ABSTRACT

A robot controller includes: a movement controller moving a robot arm including a hand; and an opening/closing controller opening and closing at least one of fingers included in hand in a predetermined direction. The movement controller causes the robot arm to bring at least one of the fingers into contact with a workpiece in a pressing direction. The opening/closing controller causes the at least one of the fingers to perform an opening action after the contact action. After the at least one of the fingers separates from the workpiece through the opening action, the movement controller causes the robot arm to perform an approaching action of moving the hand in the pressing direction to a holding position. The opening/closing controller causes the fingers to hold the workpiece by causing at least one of the fingers to close in a state where the hand is located at the holding position.

10 Claims, 12 Drawing Sheets

(58) Field of Classification Search
CPC .......... G05B 2219/39466; G05B 2219/39527; G05B 2219/40053; G05B 2219/45063
USPC ................ 700/245–264; 318/568.11–568.25
See application file for complete search history.

(56) References Cited

U.S. PATENT DOCUMENTS

| | | | | |
|---|---|---|---|---|
| 8,863,623 | B2* | 10/2014 | Nashimoto | B25B 7/12 81/417 |
| 8,914,964 | B2* | 12/2014 | Hasegawa | B21D 39/023 72/220 |
| 9,108,321 | B2* | 8/2015 | Emoto | B25J 19/023 |
| 9,757,863 | B2* | 9/2017 | Suzuki | B25J 15/0425 |
| 9,978,616 | B2* | 5/2018 | Izumi | B32B 37/0046 |
| 10,352,349 | B2* | 7/2019 | Nagaki | F16B 45/026 |
| 10,407,264 | B2* | 9/2019 | Kii | G03G 15/605 |
| 10,675,767 | B2* | 6/2020 | Takaoki | G05B 19/425 |
| 11,027,424 | B2* | 6/2021 | Umeyama | B25J 13/085 |
| 11,279,046 | B2* | 3/2022 | Seo | B25J 15/0061 |
| 2008/0307630 | A1* | 12/2008 | Hasegawa | B21D 19/043 72/220 |
| 2010/0325961 | A1* | 12/2010 | Kusatsugu | G03B 11/043 49/150 |
| 2012/0291293 | A1* | 11/2012 | Nashimoto | B25B 7/00 81/415 |
| 2012/0291508 | A1* | 11/2012 | Hasegawa | B21D 39/023 72/214 |
| 2014/0074291 | A1* | 3/2014 | Emoto | B25J 9/1697 700/258 |
| 2014/0349118 | A1* | 11/2014 | Izumi | H01L 21/67126 428/411.1 |
| 2016/0175908 | A1* | 6/2016 | Obinata | B21D 7/024 72/159 |
| 2016/0221196 | A1* | 8/2016 | Suzuki | B25J 15/0475 |
| 2018/0223895 | A1* | 8/2018 | Nagaki | F16B 1/02 |
| 2018/0229955 | A1* | 8/2018 | Kii | B65H 5/062 |
| 2018/0333858 | A1* | 11/2018 | Asano | B25J 13/082 |
| 2019/0001491 | A1* | 1/2019 | Umeyama | B25J 9/1612 |
| 2019/0039250 | A1* | 2/2019 | Takaoki | G05B 19/425 |
| 2020/0243351 | A1* | 7/2020 | Tanaka | H01L 21/02096 |
| 2021/0154862 | A1* | 5/2021 | Seo | B25J 15/103 |

* cited by examiner

ROBOT CONTROL DEVICE, ROBOT SYSTEM, AND ROBOT CONTROL PROGRAM

FIELD

The technique disclosed here relates to a robot controller, a robot system, and a robot control program.

BACKGROUND

A controller of a robot that holds a workpiece with fingers is known to date. Patent Document 1, for example, discloses a technique of adjusting distances between fingers in accordance with the shape of a workpiece and other features in holding the workpiece with the fingers.

CITATION LIST

Patent Document

Patent Document 1: Japanese Patent Application Publication No. 2021-84210

SUMMARY

In holding a workpiece, a hand is first moved to a position at which the workpiece can be held, that is, a position at which the workpiece is located between fingers, and in this state, the fingers are caused to perform a closing action so that the workpiece is thereby held with the fingers. That is, in holding the workpiece, the hand needs to be appropriately moved to a holding position.

If the position accuracy of the hand or the workpiece is low, however, interference of fingers with the workpiece or other troubles occur so that the hand cannot be appropriately moved to a position at which the workpiece can be held, in some cases.

It is therefore an object of the technique disclosed here to easily achieve appropriate holding of a workpiece with fingers.

A robot controller disclosed here includes: a movement controller that moves an arm including a hand; and an opening/closing controller that opens and closes at least one of fingers included in the hand in a predetermined opening/closing direction, wherein the movement controller causes the arm to perform a contact action of bringing at least one of the fingers into contact with a workpiece in a pressing direction, the pressing direction intersecting with the opening/closing direction, the opening/closing controller causes the at least one of the fingers to perform an opening action after the contact action, after the at least one of the fingers is separated from the workpiece through the opening action, the movement controller causes the arm to perform an approaching action of moving the hand in the pressing direction to a predetermined holding position at which the workpiece is located between the fingers, and the opening/closing controller causes the fingers to hold the workpiece by causing at least one of the fingers to perform a closing action in a state where the hand is located at the holding position.

A robot system disclosed here includes: a hand including fingers, each of the fingers being capable of opening and closing; an arm including the hand; and the robot controller.

A robot control program disclosed here causes a computer to execute the functions of: causing an arm including a hand to perform a contact action of bringing at least one of fingers into contact with a workpiece in a pressing direction, the fingers being included in the hand and capable of opening and closing in a predetermined opening/closing direction, the pressing direction intersecting with the opening/closing direction; causing at least one of the fingers to perform an opening action after the contact action; causing the arm to perform an approaching action of moving the hand in the pressing direction to a predetermined holding position at which the workpiece is located between the fingers, after the at least one of the fingers is separated from the workpiece through the opening action; and causing the at least one of the fingers to perform a closing operation in a state where the hand is at the holding position to thereby cause the fingers to hold the workpiece.

The robot controller can easily achieve appropriate holding of a workpiece with fingers.

The robot system can easily achieve appropriate holding of a workpiece with fingers.

The robot control program can easily achieve appropriate holding of a workpiece with fingers.

DESCRIPTION OF EMBODIMENTS

Figure 1:
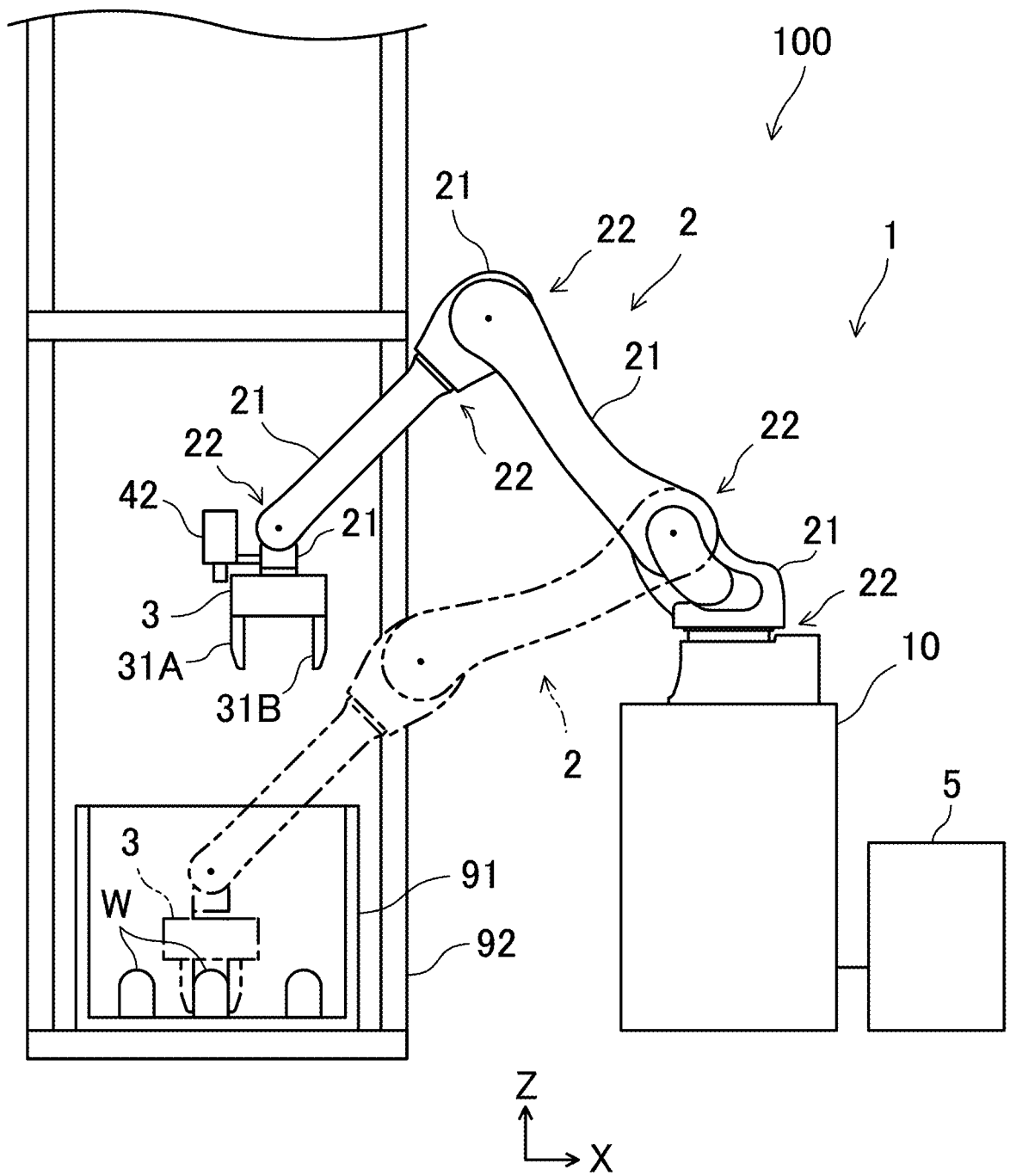
FIG. 1 is a schematic view illustrating a configuration of a robot system.

An exemplary embodiment will be described in detail hereinafter with reference to the drawings. FIG. 1 is a schematic view illustrating a configuration of a robot system 100.

The robot system 100 includes a robot 1 and a robot controller 5 that controls the robot 1. The robot 1 includes a robot arm 2 and a hand 3 including fingers 31 capable of opening and closing. The hand 3 is attached to the robot arm 2.

In this example, the robot 1 performs a picking action of holding a workpiece W with the fingers 31 and conveying the workpiece W. Specifically, the robot 1 takes a specific workpiece W from a container 91 and conveys the workpiece W to a specific place. Multiple workpieces W are housed in the container 91. The container 91 is placed on, for example, a shelf 92.

In this example, the robot 1 is an industrial robot. In a space where the robot 1 is disposed, a robot coordinate system of three orthogonal axes is defined. For example, a Z axis is defined in the top-bottom direction, and an X axis and a Y axis are defined to be orthogonal to each other in the horizontal direction.

The robot 1 further includes a force sensor 41 (see FIG. 2) that detects a pressing force of the fingers 31 against the workpiece W. The robot 1 also includes an imager 42.

The robot arm 2 moves in three dimensions. In this example, the robot arm 2 is a vertical articulated robot arm. The robot arm 2 is supported by a base 10. The robot arm 2 includes links 21 and joints 22 connecting the links 21. The hand 3 is coupled to the links 21 at the distal end of the robot arm 2.

The robot arm 2 includes servo motors 23 (see FIG. 3) that rotationally drive the joints. Each of the servo motor 23 includes an encoder 24 (see FIG. 3).

Figure 2:
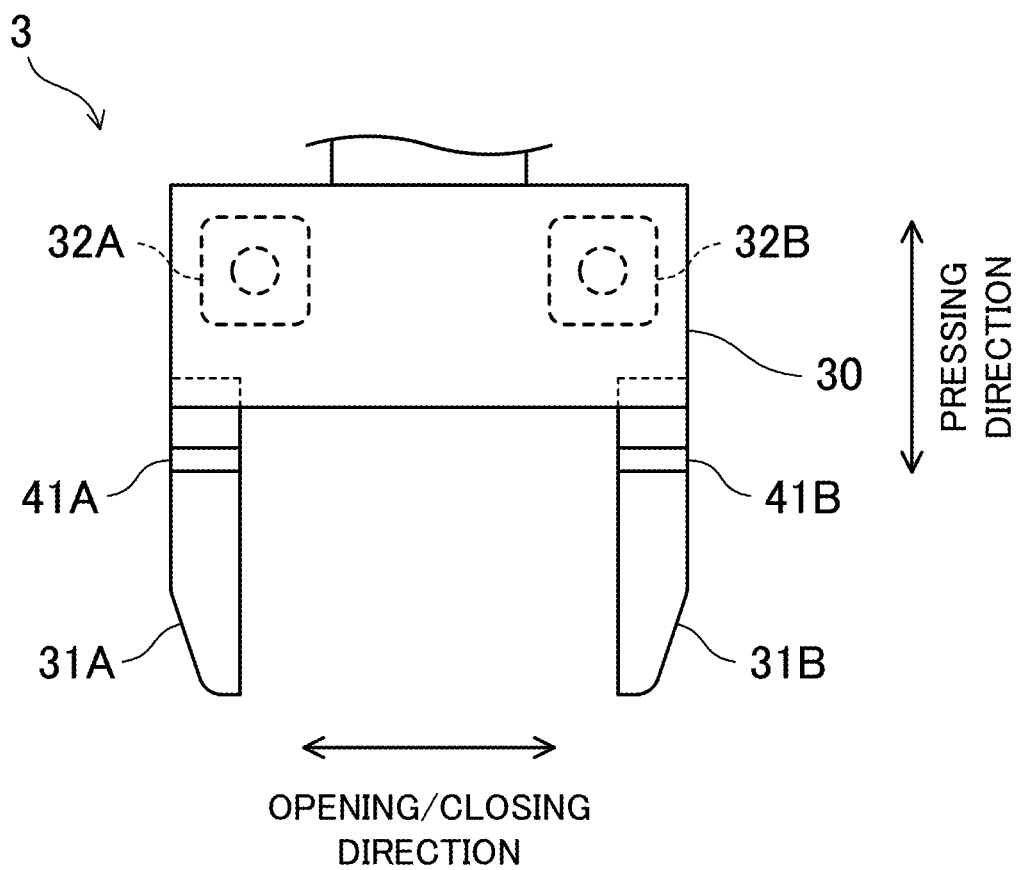
FIG. 2 is an enlarged view of a hand.

The hand 3 is an end effector attached to the robot arm 2. FIG. 2 is an enlarged view of the hand 3. The hand 3 includes fingers that open and close in a predetermined opening/closing direction. Specifically, the hand 3 includes a first finger 31A and a second finger 31B. The first finger 31A and the second finger 31B are supported by a body 30 of the hand 3 to be slidable in the opening/closing direction. The first finger 31A and the second finger 31B extend from the body 30 in a direction substantially orthogonal to the opening/closing direction.

The hand 3 further includes servo motors that open and close the fingers independently of each other. Specifically, the hand 3 includes a first servo motor 32A that drives the first finger 31A and a second servo motor 32B that drives the second finger 31B. With torques of the first servo motor 32A and the second servo motor 32B, holding forces of the first finger 31A and the second finger 31B are adjusted. Each of the first servo motor 32A and the second servo motor 32B includes an encoder 33 (see FIG. 3). The first servo motor 32A and the second servo motor 32B are examples of a driving source.

When the first finger 31A and the second finger 31B are not distinguished, the first finger 31A and the second finger 31B are referred to simply as "fingers 31" in some cases. When the first servo motor 32A and the second servo motor 32B are not distinguished, the first servo motor 32A and the second servo motor 32B are referred to simply as "servo motors 32" in some cases.

The force sensor 41 is included in each of the fingers 31. Specifically, the force sensor 41 is included in each of the first finger 31A and the second finger 31B. The force sensor 41 included in the first finger 31A will be referred to as a "first force sensor 41A," and the force sensor 41 included in the second finger 31B will be referred to as a "second force sensor 41B." When the first force sensor 41A and the second force sensor 41B are not distinguished, the first force sensor 41A and the second force sensor 41B are referred to simply as "force sensors 41." The force sensor 41 detects at least a force in a direction intersecting with the opening/closing direction, specifically, a direction substantially orthogonal to the opening/closing direction. The direction of a force detected by the force sensor 41 may be substantially the same as the direction in which the finger 31 extends. In this example, the force sensor 41 detects forces along three orthogonal axes and moments around the three axes. One of the three orthogonal axes is the direction intersecting with the opening/closing direction. The force sensor 41 is an example of a sensor.

The imager 42 takes a two-dimensional image. The imager 42 is included in the robot arm 2. Specifically, the imager 42 is attached to the links 21 at the distal end of the robot arm 2, as illustrated in FIG. 1. For example, the imager 42 captures an image of the workpiece W in the container 91 from above the container 91. The imager 42 outputs the captured image to the robot controller 5.

Figure 3:
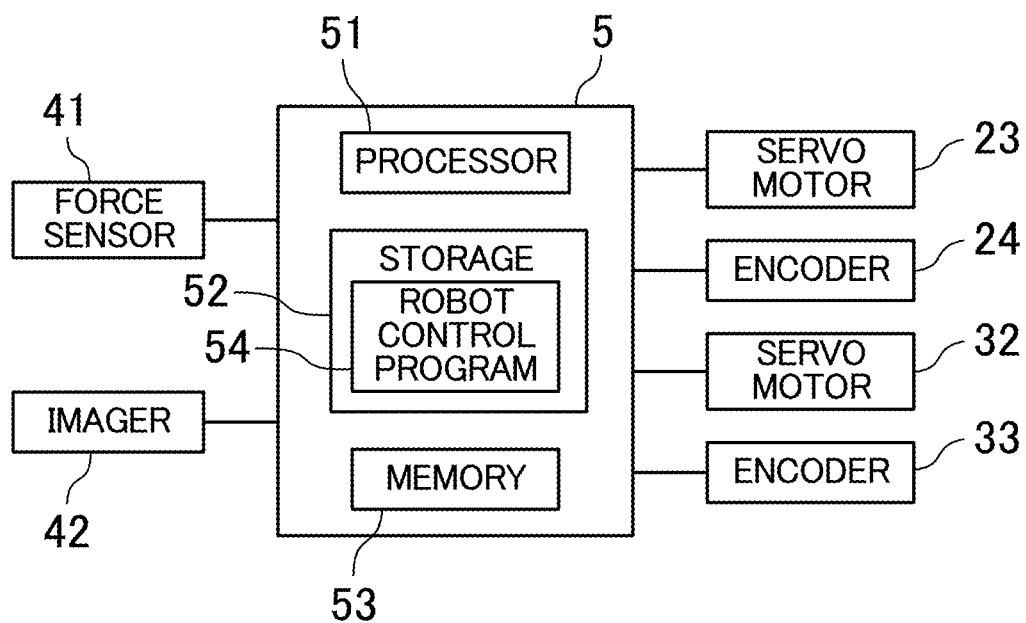
FIG. 3 shows a schematic hardware configuration of a robot controller.

FIG. 3 shows a schematic hardware configuration of the robot controller 5. The robot controller 5 receives a detection result of the force sensor 41 and a captured image of the imager 42. The robot controller 5 controls the servo motor 23 of the robot arm 2 and the servo motor 32 of the hand 3. For example, the robot controller 5 supplies a current to the servo motor 23. At this time, the robot controller 5 performs feedback control on the supplied current based on an output of the encoder 24. The robot controller 5 controls the servo motor 32 of the hand 3 to thereby open or close the two fingers 31. At this time, the robot controller 5 performs feedback control on the supplied current based on an output of the encoder 33. For example, the robot controller 5 causes the robot 1 to perform a picking action of taking a workpiece W from the container 91 by the hand 3 and conveying the workpiece W to a predetermined place.

The robot controller 5 includes a processor 51, a storage 52, and a memory 53.

The processor 51 controls the entire robot controller 5. The processor 51 performs various computations. For example, the processor 51 is a processor such as a central processing unit (CPU). The processor 51 may be a micro controller unit (MCU), a micro processor unit (MPU), a field programmable gate array (FPGA), a programmable logic controller (PLC), system LSI, or the like.

The storage 52 stores programs and various types of data to be executed by the processor 51. For example, the storage 52 stores a robot control program 54. The storage 52 is a nonvolatile memory, a hard disc drive (HDD), or a solid state drive (SSD), for example.

The memory 53 temporarily stores data or other information. For example, the memory 53 is a volatile memory.

Figure 4:
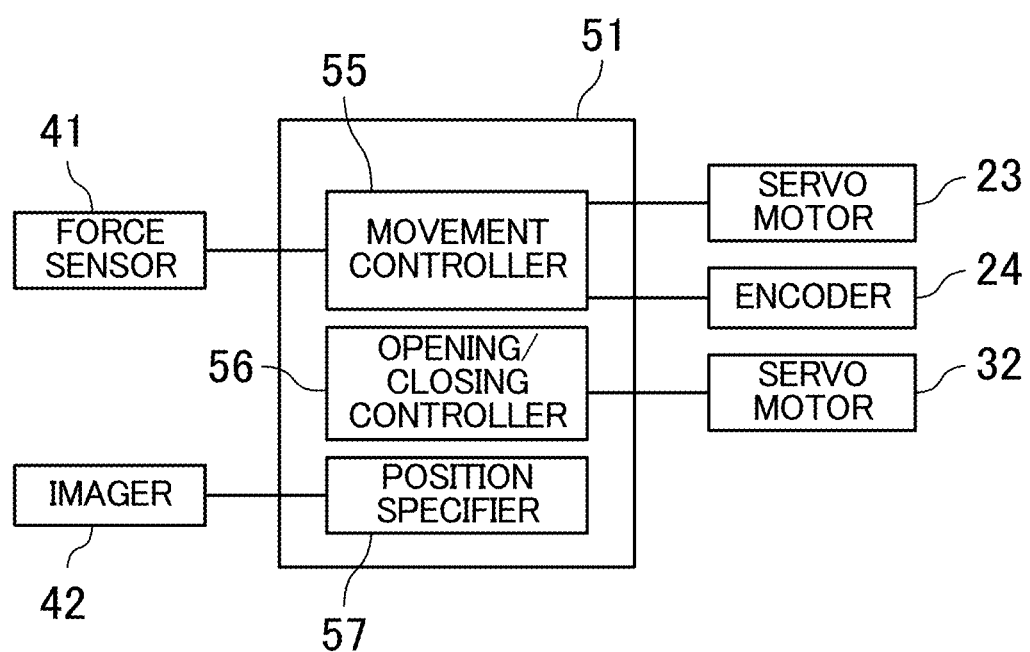
FIG. 4 is a block diagram illustrating a configuration of a control system of a processor.

FIG. 4 is a block diagram illustrating a configuration of a control system of the processor 51. The processor 51 reads the robot control program 54 from the storage 52 and develops the programs to the memory 53 to thereby operate various functions. Specifically, the processor 51 functions as a movement controller 55 that moves the robot arm 2, an opening/closing controller 56 that opens and closes the fingers 31 in an opening/closing direction, and a position specifier 57 that specifies a position of a workpiece W.

The movement controller 55 controls current to be applied to the servo motors 23 and adjusts rotation angles of the joints 22 to thereby deform and move the robot arm 2. In the following description, movement of the robot arm 2 includes deformation of the robot arm 2 unless otherwise specified.

The opening/closing controller 56 controls current to be applied to the servo motors 32 to open and close the fingers 31. Specifically, the opening/closing controller 56 calculates a torque instruction value (or a rotation angle position instruction) of the servo motor 32, and outputs the calculated torque instruction value to a servo amplifier of the servo motor 32. The servo amplifier applies a current in accordance with the torque instruction value to the servo motor 32. The opening/closing controller 56 controls the servo motors 32 independently of each other. That is, the opening/closing controller 56 opens and closes the fingers 31 independently of each other. For example, the opening/closing controller 56 causes one of the fingers 31 to perform an opening action or a closing action with the other finger 31 stopped. The opening/closing controller 56 also causes one finger 31 to perform an opening action while causing the other finger 31 to perform a closing action. The opening/closing controller 56 controls torques of the servo motors 32 independently of each other. For example, the opening/closing controller 56 can make driving forces of the fingers 31 different from each other during the closing action of the fingers 31. The opening/closing controller 56 may adjust current applied to each servo motor 32, such as the torque instruction value, in accordance with a force in the opening/closing direction detected by the force sensor 41.

The position specifier 57 specifies the position of the workpiece W from the captured image of the imager 42. Specifically, the position specifier 57 performs image processing on the captured image to thereby specify a workpiece W in the captured image and specify the position of the workpiece W. Since the imager 42 is moved by the robot arm 2, the position of the imager 42 is known. Thus, the position specifier 57 can specify the position of a subject, that is, the workpiece W, in the captured image. In this example, since the captured image is a two-dimensional image, the position specifier 57 specifies a two-dimensional position of the workpiece W. Specifically, the position specifier 57 specifies the position of the workpiece W in an XY plane of the robot coordinate system.

The position specifier 57 also controls the imager 42. That is, the position specifier 57 causes the imager 42 to capture an image of the workpiece W.

The movement controller 55 and the opening/closing controller 56 cause the robot arm 2 and the hand 3 to perform a picking action of the workpiece W in cooperation. Specifically, the movement controller 55 and the opening/closing controller 56 cause the robot arm 2 to move the hand 3 to a holding position at which the hand 3 can hold the workpiece W, cause the fingers 31 to hold the workpiece W at the holding position, and cause the robot arm 2 to convey the workpiece W to a predetermined place. The holding position is a position at which the workpiece W is located between the fingers 31.

During movement of the hand 3 to the holding position, the finger 31 might interfere with the workpiece W. In such a case, the movement controller 55 and the opening/closing controller 56 open the finger 31 to cancel the interference between the finger 31 and the workpiece W, and then move the hand 3 to the holding position.

To explain briefly, the movement controller 55 causes the robot arm 2 to perform a contact action of bringing the finger 31 into contact with the workpiece W in a pressing direction intersecting with the opening/closing direction. When the finger 31 is brought into contact with the workpiece W, the opening/closing controller 56 causes the finger 31 to perform an opening action after the contact action. This opening action of the finger 31 is an action of canceling contact between the finger 31 and the workpiece W, and thus, can be also referred to as a "canceling action." After the fingers 31 are separated from the workpiece W through the opening action, the movement controller 55 causes the robot arm 2 to perform an approaching action of causing the hand 3 to move to the holding position in the pressing direction. In a state where the hand 3 is at the holding position, the opening/closing controller 56 causes the fingers 31 to perform a closing action so that the workpiece W is thereby held with the fingers 31.

During the opening action of the fingers 31, the movement controller 55 performs force control of the robot arm 2 such that contact of the fingers 31 with the workpiece W is maintained. Specifically, in the force control of the robot arm 2, the movement controller 55 controls the robot arm 2 such that a pressing force against the workpiece W by the fingers 31 in the pressing direction reaches a predetermined target value. Since the contact of the fingers 31 with the workpiece W is maintained during the opening action of the fingers 31, the fingers 31 gradually open while following the surface of the workpiece W. As the fingers 31 gradually open, the fingers 31 can enter a state where the fingers 31 do not contact the workpiece W any more. The "pressing force" hereinafter refers to a pressing force in the pressing direction unless otherwise specified.

The movement controller 55 performs so-called admittance control as the force control of the robot arm 2. Specifically, the movement controller 55 adjusts the position of the hand 3 such that the pressing force has the target value. The movement controller 55 performs the admittance control using a dynamical model having a mass, a spring, and a damper and corresponding to the robot arm 2. A function representing the dynamical model of the robot arm 2 is stored in the storage 52. The movement controller 55 obtains a current pressing force based on a pressing force detected by the force sensor 41. The movement controller 55 reads the function of the dynamical model from the storage 52, and the function is substituted by the pressing force detected by the force sensor 41 to thereby obtain a target position of the hand 3. The movement controller 55 calculates an angle of each joint of the robot arm 2 for obtaining the target position of the hand 3. The movement controller 55 adjusts current to be applied to the servo motors 23 to obtain the calculated joint angle.

Figure 5:
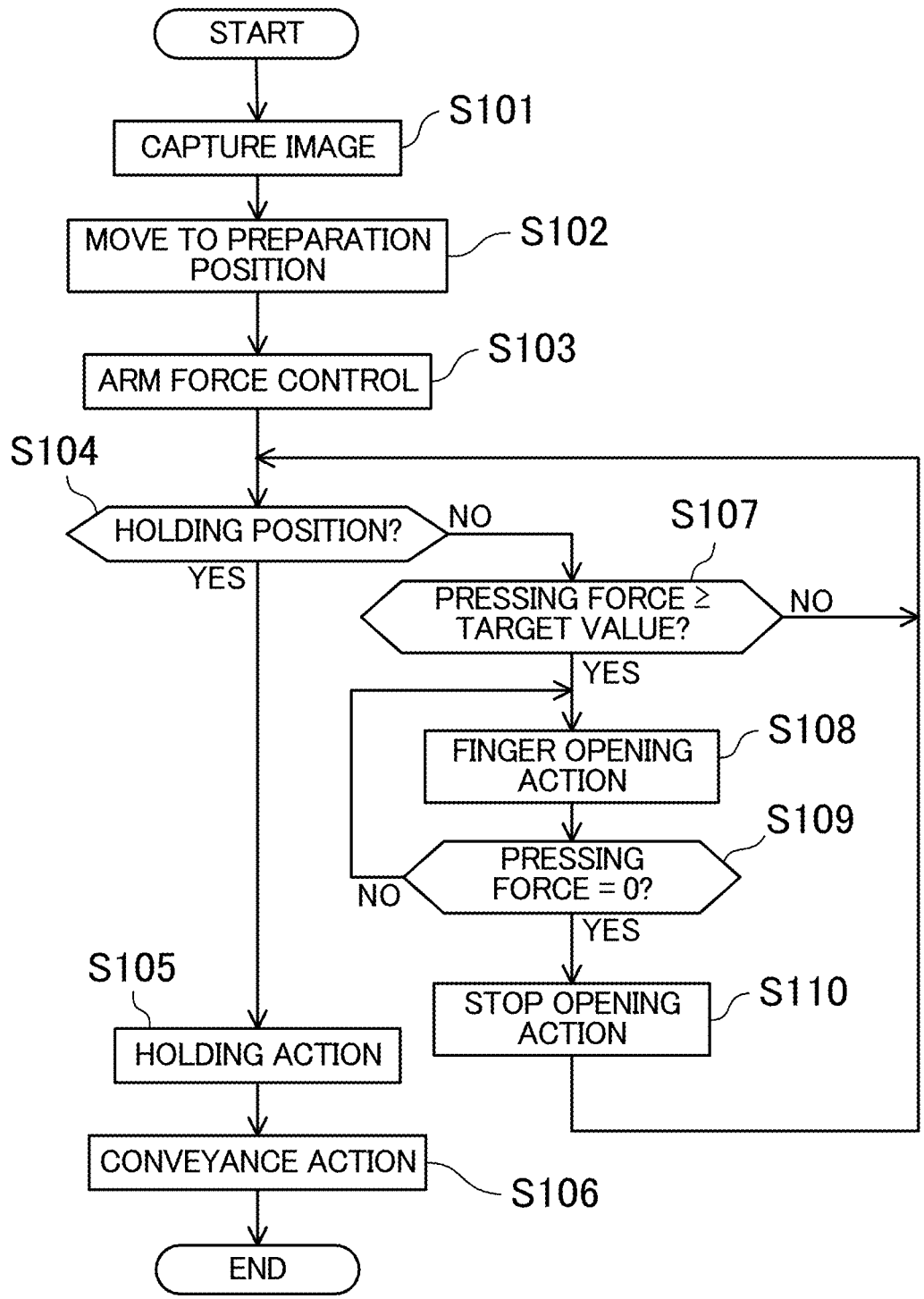
FIG. 5 is a flowchart showing a process of a picking action of a robot.

The picking action will be hereinafter further described with reference to a flowchart. FIG. 5 is a flowchart showing a process of the picking action of the robot 1.

First, in step S101, the movement controller 55 and the position specifier 57 capture an image of a workpiece W. Specifically, the movement controller 55 moves the robot arm 2 such that the imager 42 is located at a predetermined imaging position. The predetermined imaging position is a position previously determined in accordance with a picking action. For example, the imaging position is a position which is located above the container 91 and in which the entire container 91 is included in an angle of view. It should be noted that in a case where another object is present near the container 91, such as a case where the container 91 is located on the shelf 92, the imaging position is set at a position at which the members such as the robot arm 2 and the hand 3 do not interfere with the object.

When the imager 42 is placed at the imaging position, the position specifier 57 causes the imager 42 to capture an image. In this manner, an image of the workpiece W in the container 91 is captured.

The position specifier 57 specifies the position of the workpiece W from the captured image of the imager 42, specifically, the position of the workpiece W on the XY plane of the robot coordinate system.

Figure 6:
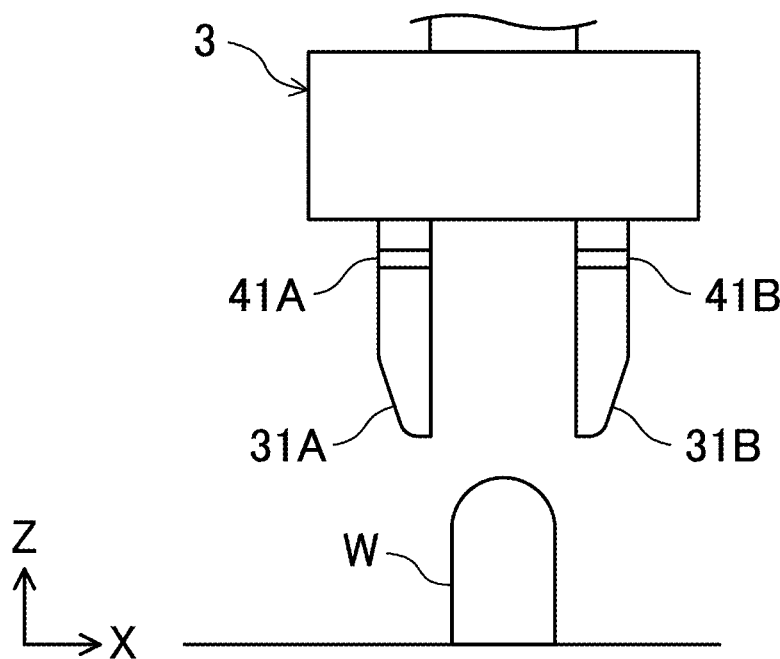
FIG. 6 illustrates an example of the hand at a preparation position.
Figure 7:
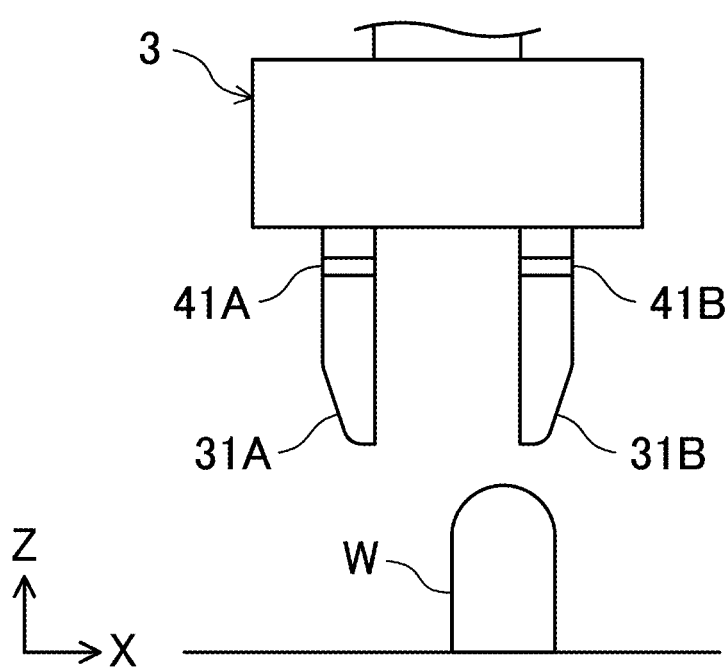
FIG. 7 illustrates the hand at a position shifted from the preparation position.

Next, in step S102, the movement controller 55 causes the robot arm 2 to move the hand 3 to a predetermined preparation position. FIG. 6 illustrates an example of the hand 3 at the preparation position. FIG. 7 illustrates the hand 3 at a position shifted from the preparation position.

The preparation position is a position at which the hand 3 and the workpiece W are aligned on a substantially straight line in the direction in which the hand 3 moves in subsequent force control, that is, in the pressing direction, and is a position at which the fingers 31 do not interfere with the workpiece W. In this example, the pressing direction is a direction substantially orthogonal to the opening/closing direction, specifically, the Z direction of the robot coordinate system. The XY coordinates of the preparation position is set based on the position of the workpiece W specified by the position specifier 57. The Z coordinate of the preparation position is previously defined in accordance with a target workpiece W. Specifically, the Z coordinate of the preparation position is located higher than the height (dimension in the Z direction) of the workpiece W.

The movement controller 55 also sets the hand 3 in a predetermined preparation posture at the preparation position. The preparation posture is a posture of the hand 3 in performing force control described later. Specifically, the preparation posture is a posture in which the opening/closing direction of the fingers 31 is substantially orthogonal to the pressing direction. In this example, the posture of the hand 3 is adjusted such that the opening/closing direction coincides with the X direction of the robot coordinate system.

Further, while the movement controller 55 moves the hand 3 to the preparation position, the opening/closing controller 56 moves the fingers 31 to a predetermined initial position. For example, the initial position is a position at which the distance between the fingers 31 is wider than the width (dimension in the opening/closing direction) of the workpiece W. The initial position is previously defined in accordance with a target workpiece W. The initial position may be defined for each picking action based on the width of the workpiece W obtained from the captured image of the imager 42.

However, the XY coordinates of the preparation position specified by the position specifier 57 might be shifted from an appropriate preparation position with some resolution of the captured image, image processing accuracy, or the like. With some position accuracy of the robot arm 2, the position of the hand 3 might be shifted from the preparation position specified by the position specifier 57. That is, the hand 3 can be shifted from the appropriate preparation position for various reasons, as illustrated in FIG. 7.

Then, in step S103, force control of controlling a pressing force of the fingers 31 against the workpiece W is started. Specifically, the movement controller 55 moves the robot arm 2 such that the pressing force of the fingers 31 against the workpiece W reaches a predetermined target value. The pressing force occurs by contact of the fingers 31 with the workpiece W. The movement controller 55 moves the fingers 31, that is, the hand 3, in the pressing direction toward the workpiece W such that a pressing force occurs.

For example, the target value of the pressing force is a value with which the workpiece W is not excessively pressed, and with which contact of the fingers 31 with the workpiece W can be observed. The movement controller 55 calculates a target position of the robot arm 2 at which the pressing force is the target value, based on the dynamical model stored in the storage 52. The movement controller 55 moves the robot arm 2 to the target position. In this manner, the movement controller 55 adjusts the position of the robot arm 2, that is, the hand 3, such that the pressing force detected by the force sensor 41 reaches the target value.

As a result, if the pressing force is smaller than the target value, the movement controller 55 moves the hand 3 toward the workpiece W in the pressing direction. On the other hand, if the pressing force is larger than the target value, the movement controller 55 moves the hand 3 away from the workpiece W in the pressing direction. In a state where the hand 3 is in the preparation position, none of the fingers 31 contacts the workpiece W, and thus, the pressing force is zero. Thus, the movement controller 55 moves the hand 3 toward the workpiece W in the pressing direction. That is, when the force control is started from the preparation position, the movement controller 55 first moves the hand 3 toward the workpiece W in the pressing direction.

When the force control is started, in step S104, the movement controller 55 determines whether the hand 3 has reached the holding position or not. In this example, the XY coordinates of the preparation position are the same as the XY coordinates of the holding position, and the hand 3 moves only in the Z direction. Thus, in step S104, the movement controller 55 determines whether the position of the hand 3 in the pressing direction, that is, in the Z direction, has reached the Z coordinate of the holding position. The Z coordinate of the holding position is previously defined in accordance with the target workpiece W. Specifically, the Z coordinate of the holding position is a position at which an appropriate portion of the workpiece W in the height direction can be held by the fingers 31.

Figure 8:
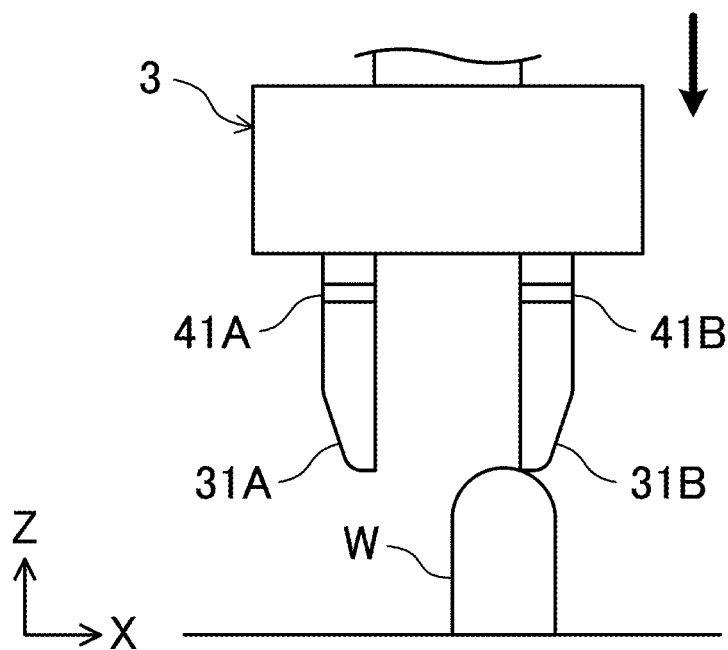
FIG. 8 illustrates the hand whose finger contacts a workpiece.

If the hand 3 has not reached the holding position, in step S107, the movement controller 55 determines whether the finger 31 is in contact with the workpiece W or not. If the hand 3 is appropriately located at the preparation position as illustrated in FIG. 6, even when the hand 3 moves in the pressing direction, the possibility that the finger 31 contacts the workpiece W is low. On the other hand, if the hand 3 is not appropriately located at the preparation position as illustrated in FIG. 7, when the hand 3 moves in the pressing direction, the finger 31 can contact the workpiece W. It should be noted that even if the hand 3 is appropriately located at the preparation position, with some position accuracy of the robot arm 2, the hand 3 does not move straight in the pressing direction, and the finger 31 might contact the workpiece W. FIG. 8 illustrates the hand 3 whose finger 31 contacts the workpiece W. In FIG. 8, the second finger 31B is in contact with the workpiece W.

Specifically, the movement controller 55 determines whether a pressing force detected by any one of the force sensors 41 has reached the target value or more. If none of the fingers 31 is in contact with the workpiece W, the movement controller 55 returns to the process of step S104. At this time, since the force control continues, the movement controller 55 continues movement of the hand 3 in the pressing direction. Then, the movement controller 55 performs the process of step S104 again. That is, the movement controller 55 continues movement of the hand 3 in the pressing direction until the hand 3 reaches the holding position or any one of the fingers 31 contacts the workpiece W. Operation of the robot arm 2 until the finger 31 contacts the workpiece W corresponds to a contact action of bringing the finger 31 into contact with the workpiece W in the pressing direction.

If any one of the fingers 31 contacts the workpiece W, in step S108, the opening/closing controller 56 causes the hand 3 to perform an opening action of the finger 31. Specifically, the opening/closing controller 56 stops one of the fingers 31 that is not in contact with the workpiece W, whereas causing the other finger 31 in contact with the workpiece W to perform an opening action. For example, as illustrated in FIG. 8, in a case where the first finger 31A is not in contact with the workpiece W and the second finger 31B is in contact with the workpiece W, the opening/closing controller 56 stops the first finger 31A and causes the second finger 31B to perform an opening action.

Figure 9:
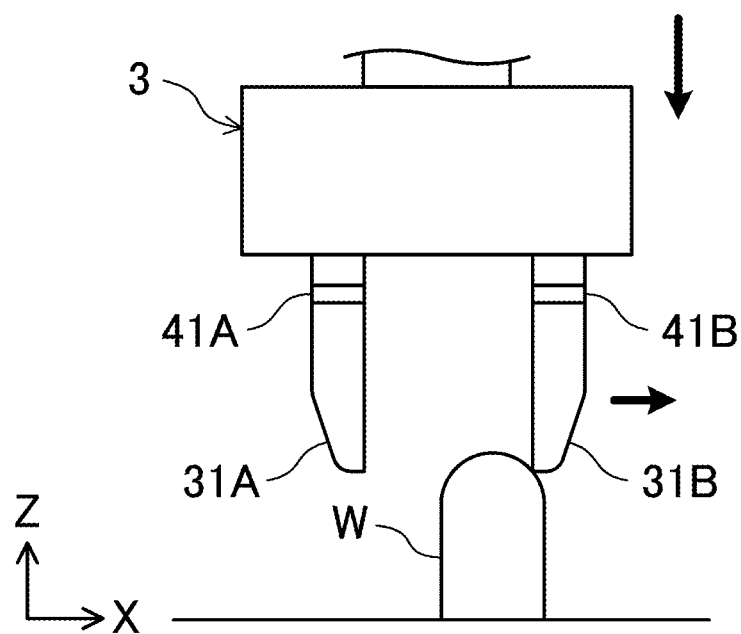
FIG. 9 illustrates the hand that causes the finger to perform an opening action.

During the opening action of the finger 31, the movement controller 55 still continues force control of the robot arm 2 such that the contact of the finger 31 with the workpiece W is maintained. FIG. 9 illustrates the hand 3 that causes the finger 31 to perform an opening action. In parallel with the opening action of the second finger 31B, as illustrated in FIG. 9, the movement controller 55 causes the robot arm 2 to adjust the position of the hand 3 in the pressing direction to thereby maintain the state where the second finger 31B is pressed against the workpiece W with a pressing force approximately equal to the target value. As a result, the second finger 31B gradually opens while following the surface shape of a portion of the workpiece W with which the second finger 31B is in contact. In the example of FIG. 9, as the second finger 31B opens, the hand 3 gradually approaches the workpiece W in the pressing direction.

Figure 10:
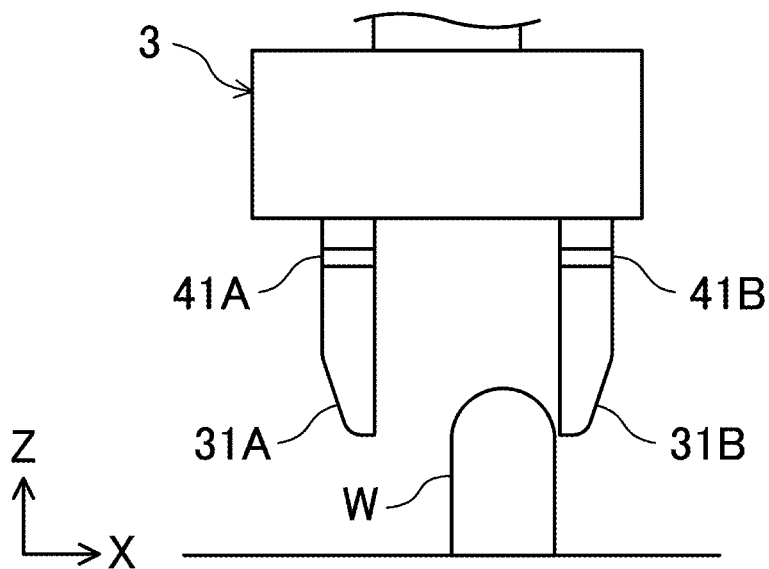
FIG. 10 illustrates the hand in a state where the fingers are not in contact with the workpiece as a result of the opening action.

Thereafter, in step S109, the opening/closing controller 56 determines whether the finger 31 opens to a state where the finger 31 does not contact the workpiece W. Specifically, the opening/closing controller 56 determines whether the pressing force of the finger 31 against the workpiece W reaches zero or not. As a result of performing the opening action of the finger 31 and the force control of the robot arm 2 in parallel, when the finger 31 expands across the workpiece W in the opening/closing direction, the finger 31 is not in contact with the workpiece W any more. At this time, the pressing force becomes zero. FIG. 10 illustrates the hand 3 in the state where the finger 31 is not in contact with the workpiece W any more as a result of the opening action. As illustrated in FIG. 10, as a result of the opening action, both the first finger 31A and the second finger 31B are not in contact with the workpiece W.

When the finger 31 opens to the state of not contacting the workpiece W, in step S110, the opening/closing controller 56 stopes the opening action of the finger 31. The opening/closing controller 56 may stop the opening action of the finger 31 immediately after the pressing force reaches zero or may continue the opening action of the finger 31 for a while after the pressing force reaches zero and then stop the opening action. In the example of FIG. 10, the opening action of the second finger 31B continues to a predetermined amount after the pressing force reaches zero, and then, the opening action of the second finger 31B is stopped.

In a case where the finger 31 is still in contact with the workpiece W even when the finger 31 opens to the maximum, the process is performed again from step S101.

When the opening action of the finger 31 is stopped, the process of step S104 is performed again. Even when the opening action of the finger 31 is stopped, the movement controller 55 continues the force control. Accordingly, movement of the hand 3 in the pressing direction continues. In step S104, the movement controller 55 determines whether the hand 3 has reached the holding position or not. If the hand 3 has not reached the holding position, the movement controller 55 determines whether the finger 31 contacts the workpiece W or not in step S105. That is, the movement controller 55 continues movement of the hand 3 in the pressing direction until the hand 3 reaches the holding position or any one of the fingers 31 contacts the workpiece W. An action of moving the hand 3 to the holding position in the pressing direction after the finger 31 is separated from the workpiece W through the opening action of the finger 31 corresponds to the approaching action.

In a case where the finger 31 contacts the workpiece W again, the process of step S108 and subsequent processes are performed. In a case where the width of the workpiece W increases stepwise in the pressing direction, even in the state where the finger 31 is separated from the workpiece W through the opening action of the finger 31, the finger 31 can contact the workpiece W again by movement of the hand 3 in the pressing direction in some cases.

Figure 11:
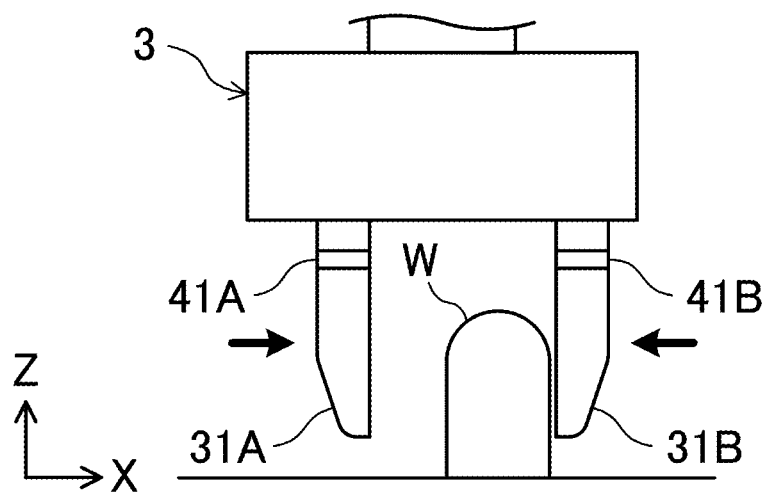
FIG. 11 illustrates the hand at a holding position.

On the other hand, in step S104, if it is determined that the hand 3 has reached the holding position, the movement controller 55 stops the force control. Then, in step S105, the opening/closing controller 56 causes the hand 3 to perform the holding action. FIG. 11 illustrates the hand 3 in the holding position. In the holding position, as illustrated in FIG. 11, the workpiece W is located between the fingers 31. In this state, the fingers 31 perform a closing action.

In a case where the hand 3 moves from the preparation position to the holding position with the finger 31 kept separated from the workpiece W, steps S104 and S107 are repeated, and then, the process of step S105 is performed.

Figure 12:
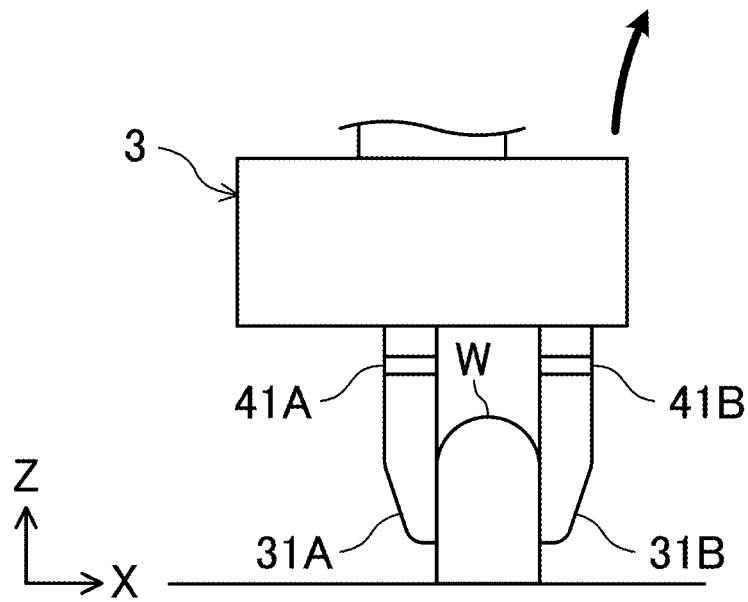
FIG. 12 illustrates the hand after a holding action is completed.

FIG. 12 illustrates the hand 3 after the holding action is completed. In the holding action, the time at which each finger 31 contacts the workpiece W varies depending on the positional relationship between the finger 31 and the workpiece W. At this time, the opening/closing controller 56 controls a torque of each servo motor 32. In the closing action of the fingers 31, the opening/closing controller 56 operate all the servo motors 32 with the same torque. When any one of the fingers 31 contacts the workpiece W, the finger 31 contacting the workpiece W does not easily move in the closing direction because of the workpiece W serving as a resistance. The finger 31 not in contact with the workpiece W moves in the closing direction without change. Subsequently, as illustrated in FIG. 12, all the fingers 31 contact the workpiece W and hold the workpiece W. That is, the amount of movement of each finger 31 in the closing direction can vary depending on the positional relationship between the finger 31 and the workpiece W. The workpiece W is held by the fingers 31 substantially at the same position as that before start of the holding action.

It should be noted that in a case where the workpiece W is simply placed on a placing surface, if a pressing force of the finger 31 performing the closing action is larger than a friction force between the workpiece W and the placing surface, the workpiece W can move from the position before start of the holding action.

When the holding action is completed, in step S106, the movement controller 55 causes the robot arm 2 to perform a conveyance action. Specifically, the movement controller 55 moves the robot arm 2 such that the workpiece W is conveyed to a predetermined place. The opening/closing controller 56 may move the fingers 31 to a center position of the hand 3 in the opening/closing direction with the workpiece W held by the fingers 31 before the workpiece W reaches the predetermined place. Accordingly, the movement controller 55 can make the positional relationship between the hand 3 and the workpiece W uniform so that the workpiece W can be conveyed to the predetermined place with a high position accuracy. When the workpiece W is conveyed to the predetermined place, the opening/closing controller 56 causes the hand 3 to perform an opening action and releases holding of the workpiece W with the fingers 31.

In this manner, the picking action is completed. In the case of performing a picking action of another workpiece W, the process of step S101 is performed again.

In this manner, with the picking action of the robot system 100, even if the finger 31 interferes with the workpiece W in moving the hand 3 to the holding position of the workpiece W, this interference can be canceled, and the hand 3 can be appropriately moved to the holding position. As a result, the workpiece W can be appropriately held with the fingers 31.

For example, even in a case where the actual position of the workpiece W is shifted from the position of the workpiece W recognized by the robot controller 5, the hand 3 can be appropriately moved to the holding position. As described above, in the case of specifying the position of the workpiece W from the captured image of the imager 42, an image of the workpiece W might not be appropriately captured with some resolution, brightness, angle of view, and so forth, resulting in the possibility of a decrease in accuracy of specifying the position of the workpiece W. For example, as illustrated in FIG. 1, in the case of capturing an image of the workpiece W in the container 91 placed on the shelf 92, a failure might occur in placing the imager 42 at an appropriate position due to constraint by interference between the robot arm 2 and the shelf 92 and/or the inside of the container 91 might be dark. In such a case, an appropriate image of the workpiece W cannot be acquired, which causes the difficulty in specifying the position of the workpiece W with high accuracy. These problems, of course, can be solved by employing an imager with high performance, but costs will increase.

Even in a case where accuracy of the position of the workpiece W recognized by the robot controller 5 is low, the finger 31 can be brought into contact with the workpiece W by generally setting the preparation position of the hand 3 to generally correspond to the workpiece W and moving the hand 3 from the preparation position in the pressing direction. Once the finger 31 contacts the workpiece W, the contact between the finger 31 and the workpiece W is canceled by causing the finger 31 to perform an opening action, and a state where the workpiece W is acceptable between the fingers 31 can be obtained. Thereafter, the hand 3 is caused to further approach the workpiece W so that the hand 3 can be thereby appropriately moved to the holding position.

That is, it is sufficient to set the preparation position of the hand 3 to correspond to the workpiece W within a range where the finger 31 contacts the workpiece W if the hand 3 is moved from the preparation position in the pressing direction. The position accuracy of the preparation position does not need to be significantly high.

This is not limited to the case where the robot controller 5 specifies the position of the workpiece W from the captured image of the imager 42, and the same applies to a case where the position of the workpiece W is given to the robot controller 5 from the outside. For example, in a case where the position of the workpiece W is generally determined, the position of the workpiece W may be input to the robot controller 5 beforehand. Even if the position of the workpiece W given from the outside is shifted from the actual position of the workpiece W, the robot system 100 can achieve appropriate holding of the workpiece through the operation described above.

Even in a case where the position accuracy of the hand 3 adjusted by the robot arm 2 is not high, the hand 3 can be appropriately moved to the holding position. That is, in moving the hand 3 from the preparation position in the pressing direction, even if the position of the hand 3 is shifted from a target, when the finger 31 can be brought into contact with the workpiece W, the hand can be appropriately moved to the holding position through the above-described opening action or other actions of the finger 31.

In addition, even with a variation in size of workpieces W, the hand 3 can be appropriately moved to the holding position. That is, even if there is variation in the sizes of workpieces W, the hand 3 can be appropriately moved to the holding position by bringing the finger 31 into contact with the workpiece W and then canceling the contact through the opening action of the fingers 31. The case where there is variation in the sizes of workpieces W includes not only a case where there is variation in the sizes of workpieces W of the same type but also a case where workpieces W of different types with different sizes or shapes are to be held. That is, the hand 3 can be appropriately moved to the holding position independently of the type of the workpiece W.

In addition, in the picking action described above, temporary contact of the finger 31 with the workpiece W is acceptable while the hand 3 is moved to the holding position, and thus, the distance between the fingers 31 in moving the hand 3 to the holding position does not need to be excessively increased. Accordingly, the interval between workpieces W before being held can be narrowed so that a packing rate of workpieces W can be thereby increased. That is, if the distance between the fingers 31 is set to be large to prevent contact of the fingers 31 with the workpiece W, the distance between two workpieces W needs to be large to avoid interference of the fingers 31 with the workpiece W adjacent to the workpiece W to be held. In this case, packing rate of workpieces W in the container 91 or other space decreases. The reduction of the distance between the fingers 31 of the hand 3 that is being moved to the holding position can reduce the possibility of interference of the fingers 31 with the workpiece W adjacent to the workpiece W to be held. As a result, the distance between the workpieces W can be reduced so that packing rate of workpieces W can be thereby increased.

In addition, in causing the finger 31 to perform an opening action after the finger 31 contacts the workpiece W, the robot controller 5 performs force control of the robot arm 2 such that the contact of the finger 31 with the workpiece W in the pressing direction is maintained. Accordingly, the finger 31 can perform the opening action while following the surface shape of the contact portion of the workpiece W. As a result, the robot controller 5 can easily determine that the finger 31 opens to cancel the contact with the workpiece W, based on a pressing force of the finger 31.

Figure 13:
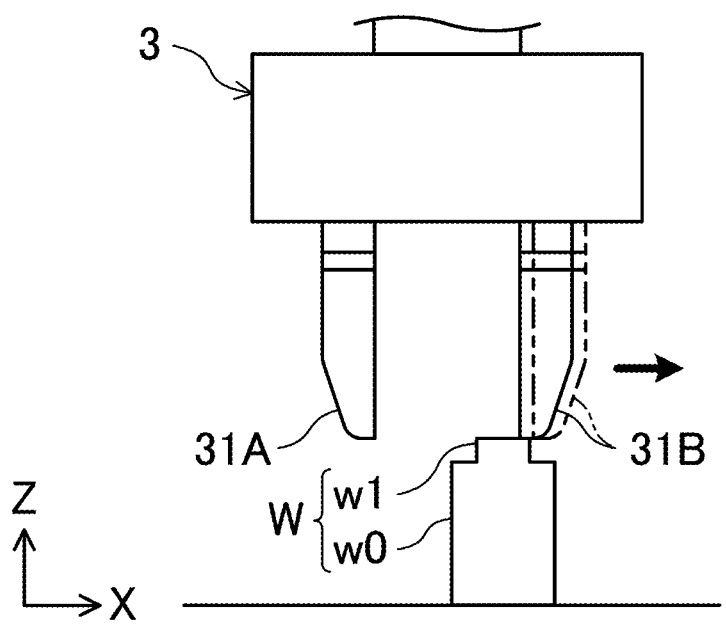
FIG. 13 illustrates the hand performing a first opening action in holding a workpiece whose width differs between an upper portion and a body thereof.
Figure 14:
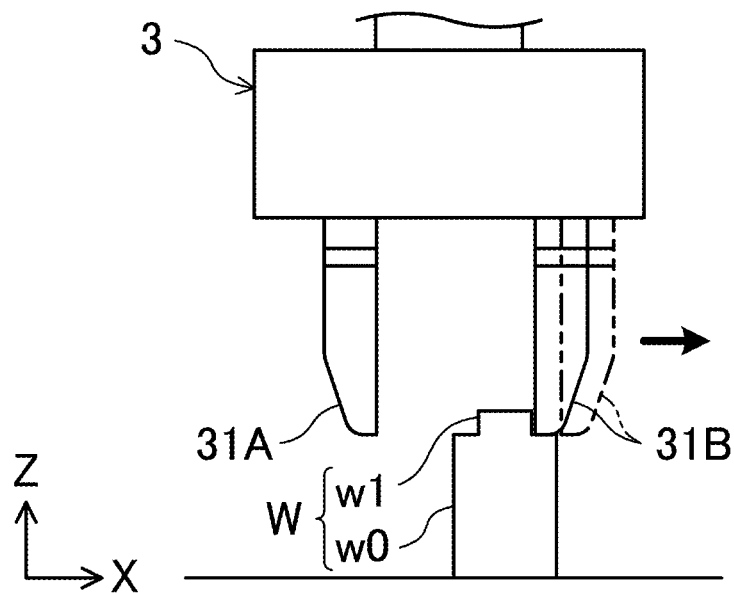
FIG. 14 illustrates the hand performing a second opening action in holding the workpiece whose width differs between the upper portion and the body thereof.

Specific examples of the picking action will now be described further. FIG. 13 illustrates the hand 3 performing a first opening action in holding a workpiece W whose width differs between an upper portion w1 and a body w0 thereof. FIG. 14 illustrates the hand 3 performing a second opening action in holding a workpiece W whose width differs between the upper portion w1 and the body w0 thereof. For example, even for the workpiece W as illustrated in FIG. 13, the hand 3 can be appropriately moved to the holding position. The workpiece W illustrated in FIG. 13 has the upper portion w1 whose width is smaller than that of the body w0. Supposing that the picking action is performed according to the flowchart described above and the second finger 31B contacts the upper portion w1 of the workpiece W through the force control in step S103. Thereafter, the opening action of the second finger 31B in step S108 causes the second finger 31B to expand across the upper portion w1 of the workpiece W in the opening/closing direction. Subsequently, since the force control continues, the hand 3 moves in the pressing direction, and as illustrated in FIG. 14, the second finger 31B contacts the body w0 of the workpiece W. When the second finger 31B contacts the body w0 of the workpiece W, the opening action of the second finger 31B in step S108 is performed again. When the second finger 31B expands across the body w0 of the workpiece W in the opening/closing direction, the continuing force control causes the hand 3 to move in the pressing direction and reach the holding position. In this manner, even for the workpiece Was illustrated in FIG. 13, the hand 3 can be appropriately moved to the holding position.

Figure 15:
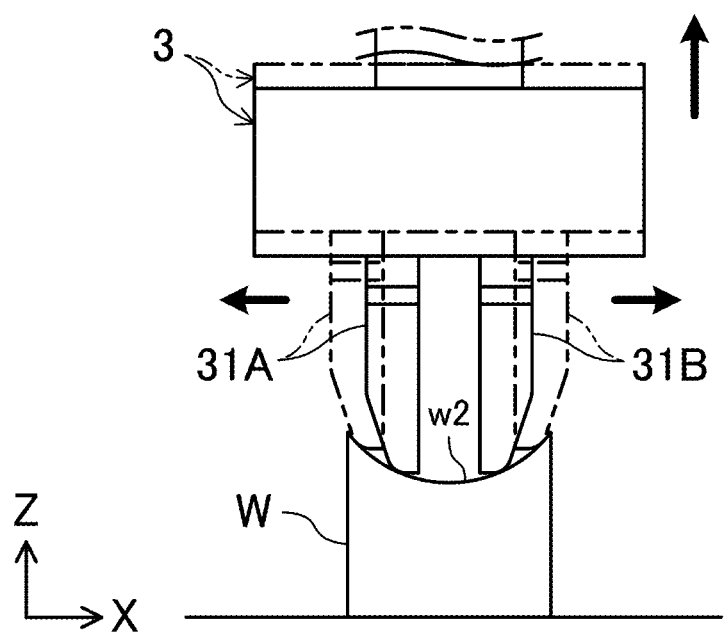
FIG. 15 illustrates the hand causing the fingers to perform an opening action to a workpiece with a recessed portion.

Alternatively, even for a workpiece W as illustrated in FIG. 15, the hand 3 can be appropriately moved to the holding position. FIG. 15 illustrates the hand 3 causing the finger 31 to perform the opening action to a workpiece W with a recessed portion W2. In the workpiece W illustrated in FIG. 15, an upper portion of the workpiece W, that is, a portion facing the hand 3 in the preparation position, has a recessed portion w2. The inner surface of the recessed portion w2 does not include a surface parallel to the pressing direction and includes a curved surface or a tilt surface tilted with respect to the pressing direction. Supposing that the picking action is performed according to the flowchart described above, and the first finger 31A and the second finger 31B contact the recessed portion w2 of the workpiece W through the force control in step S103. Subsequently, with the opening action of the fingers 31 in step S108, the first finger 31A and the second finger 31B perform the opening action. At this time, with the force control of the robot arm 2, the hand 3 toward a direction away from the workpiece W in the pressing direction such that the first finger 31A and the second finger 31B can perform the opening action along the inner surface of the recessed portion w2. When the first finger 31A and the second finger 31B come off the recessed portion w2, the first finger 31A and the second finger 31B expand across the workpiece W in the opening/closing direction. Thereafter, with the continuing force control, the hand 3 moves in the pressing direction and reaches the holding position. In this manner, with some shape of the workpiece W, the hand 3 also moves toward a direction away from the workpiece W as well as toward a direction to the workpiece W in the pressing direction during the pressing direction of the finger 31.

In the case of a workpiece W in which the inner surface of the recessed portion w2 includes a bottom surface parallel to the opening/closing direction and an edge surface rising from the edge of the bottom surface in parallel with the pressing direction, when the first finger 31A and the second finger 31B performing the opening action contact the edge surface, the first and second fingers 31A and 31B can be constrained in the edge surface. The movement controller 55 may control the robot arm 2 such that the hand 3 moves toward a direction away from the workpiece W by a predetermined distance in the pressing direction if the state where a torque (or applied current) of the serve motor 32 is a predetermined value or more continues for a predetermined period or more. Through repetition of this operation, the first finger 31A and the second finger 31B finally come off the recessed portion w2. The movement controller 55 may determine the state where the first finger 31A or the second finger 31B is constrained in the opening/closing direction, based on not a torque or a current of the servo motor 32 but a force in the opening/closing direction detected by the force sensor 41.

Figure 16:
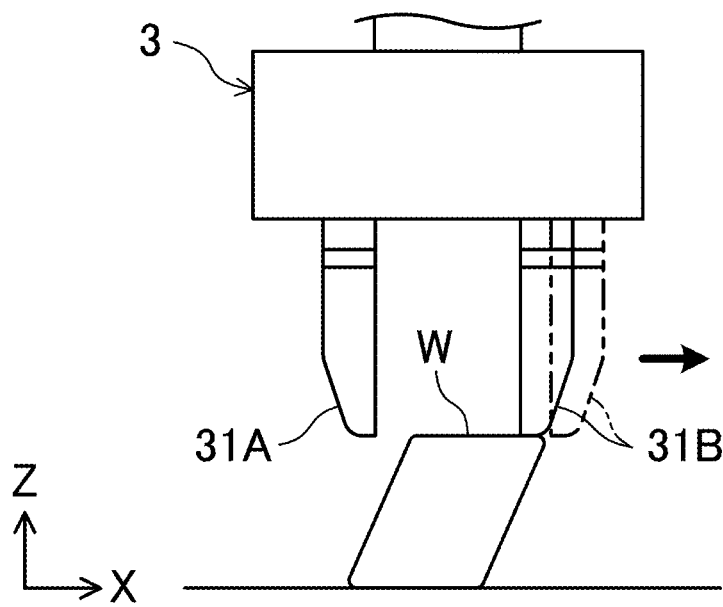
FIG. 16 illustrates the hand performing picking of a deformable workpiece and shows a state where the finger is in contact with the workpiece.
Figure 17:
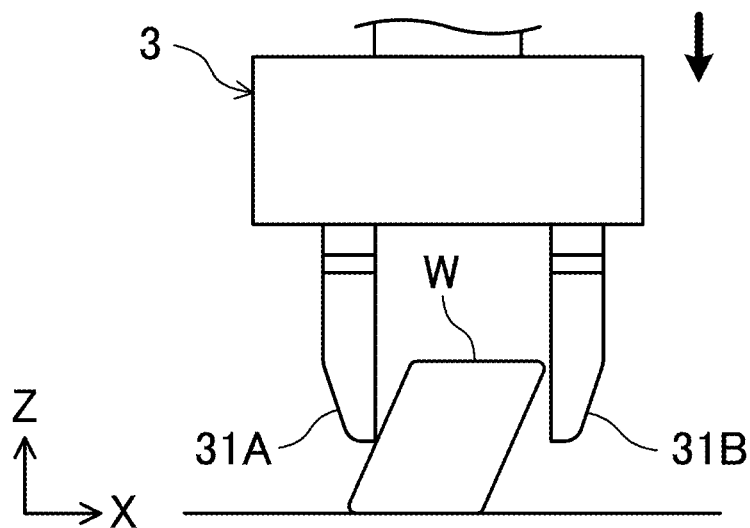
FIG. 17 illustrates the hand performing picking of the deformable workpiece and shows a state where the finger is in contact with a side surface of the workpiece.
Figure 18:
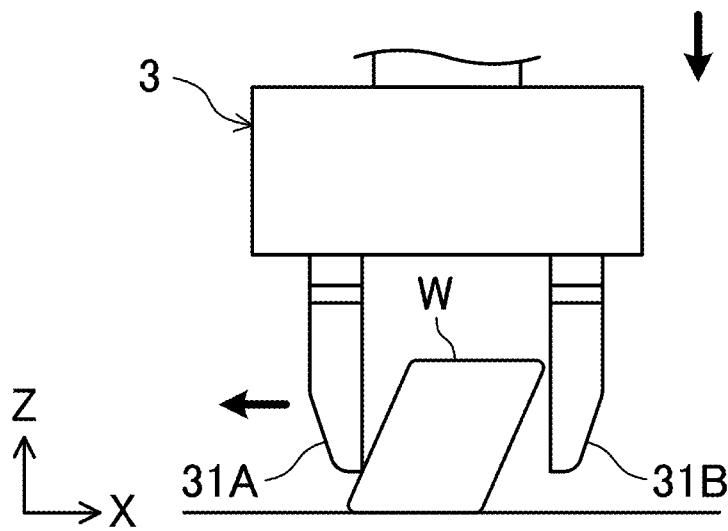
FIG. 18 illustrates the hand performing picking of the deformable workpiece and shows a state where the hand has reached a holding position.
Figure 19:
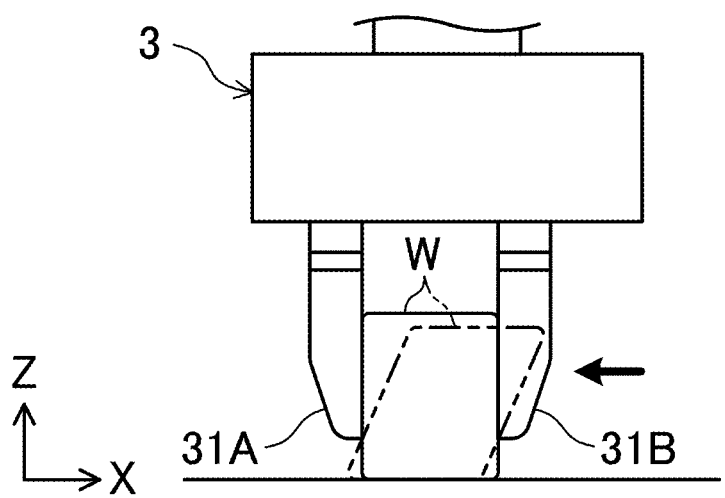
FIG. 19 illustrates the hand performing picking of the deformable workpiece and shows a state where the fingers have completed a holding action.

Further, even for a deformable workpiece W as illustrated in FIG. 16, the hand 3 can be appropriately moved to the holding position. FIG. 16 illustrates the hand 3 performing picking of a deformable workpiece W and shows a state where the finger 31 is in contact with the workpiece W. Supposing that the picking action is performed according to the flowchart described above, and the second finger 31B contacts the workpiece W through the force control in step S103. For example, the workpiece W basically has an approximately rectangular parallelepiped shape when seen from the front. The workpiece W, however, can be deformed by self weight or contact with the finger 31, for example. As illustrated in FIG. 16, the workpiece W is deformed into an approximately parallelogram shape when seen from the front. Thereafter, through the opening action of the second finger 31B in step S108, the second finger 31B expands across the workpiece W in the opening/closing direction. Subsequently, since force control continues, the hand 3 moves in the pressing direction and moves toward the holding position. During this movement, the first finger 31A can contact a side surface of the workpiece W. FIG. 17 illustrates the hand 3 performing picking of a deformable workpiece W and shows a state where the finger 31 is in contact with a side surface of the workpiece W. When the first finger 31A contacts the workpiece W, the opening action of the first finger 31A is performed in addition to the force control. As a result, while the first finger 31A gradually opens along the side surface of the workpiece W, the hand 3 moves to the holding position in the pressing direction. FIG. 18 illustrates the hand 3 performing picking of a deformable workpiece and shows a state where the hand 3 has reached the holding position. Thereafter, the first finger 31A and the second finger 31B perform a holding action to thereby hold the workpiece W. FIG. 19 illustrates the hand 3 performing picking of a deformable workpiece W and shows a state where the fingers 31 have completed the holding action. The workpiece W is deformed in accordance with the closing action of the first finger 31A and the second finger 31B and returns to the original state of a substantially rectangular parallelepiped shape when seen from the front.

In the picking action, the workpiece W may move. Through the opening action and the closing action of the finger 31, a force parallel to the placing surface of the workpiece W can be exerted on the workpiece W. In a case where this parallel force is larger than a friction force between the workpiece W and the placing surface, the workpiece W can move. Even when the workpiece W moves, as long as the workpiece W does not come out between the fingers 31, the picking action can be appropriately performed.

In the opening action of the finger 31, the finger 31 performing the opening action might contact its adjacent workpiece W next to the workpiece W to be held. In such a case, if a pressing force of the finger 31 is larger than the friction force between the adjacent workpiece W and the placing surface, the adjacent workpiece W can be shifted in parallel with the placing surface. As a result, even in a case where the distance between the workpiece W to be held and another workpiece W is narrow, the picking action can be appropriately performed.

OTHER EMBODIMENTS

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the robot 1 is not limited to an industrial robot. The robot arm 2 is not limited to a vertical articulated robot arm. The robot arm 2 may be of a horizontal articulated type, a parallel link type, a Cartesian coordinate type, a polar coordinate type, or other types. The robot arm 2 may be any robot arm as long as the robot arm can move the hand 3 in the pressing direction.

The configuration of the hand 3 is an example. Any configuration may be employed as long as the hand 3 includes the fingers including at least one finger capable of performing opening and closing actions.

For example, the number of the fingers 31 is not limited to two. The number of the fingers 31 may be three or more.

Not all the fingers 31 need to be capable of performing opening and closing actions. That is, at least one of the fingers 31 may be capable of performing opening and closing actions. In this case, the contact action is performed such that the finger 31 capable of performing opening and closing actions contacts the workpiece W. Specifically, at the preparation position, the hand 3 is preferably disposed with such a margin that ensures non-contact of the finger 31 uncapable of performing opening and closing actions with the workpiece W when the hand 3 is moved in the pressing direction.

In a configuration in which all the fingers 31 are capable of performing opening and closing actions, the fingers 31 do not need to be opened and closed independently of each other. That is, the fingers 31 may be opened and closed at the same time or in cooperation. Specifically, the fingers 31 may use only one common driving source (e.g., servo motor 32).

The driving sources of the fingers 31 are not limited to the servo motors 32. For example, the driving source may be an air actuator.

The force sensor 41 may not be included in each of the fingers 31. For example, one force sensor 41 may be included in the hand 3. Even in such a configuration, when any one of the fingers 31 contacts the workpiece W, the force sensor 41 can detect a pressing force through this finger 31.

Figure 20:
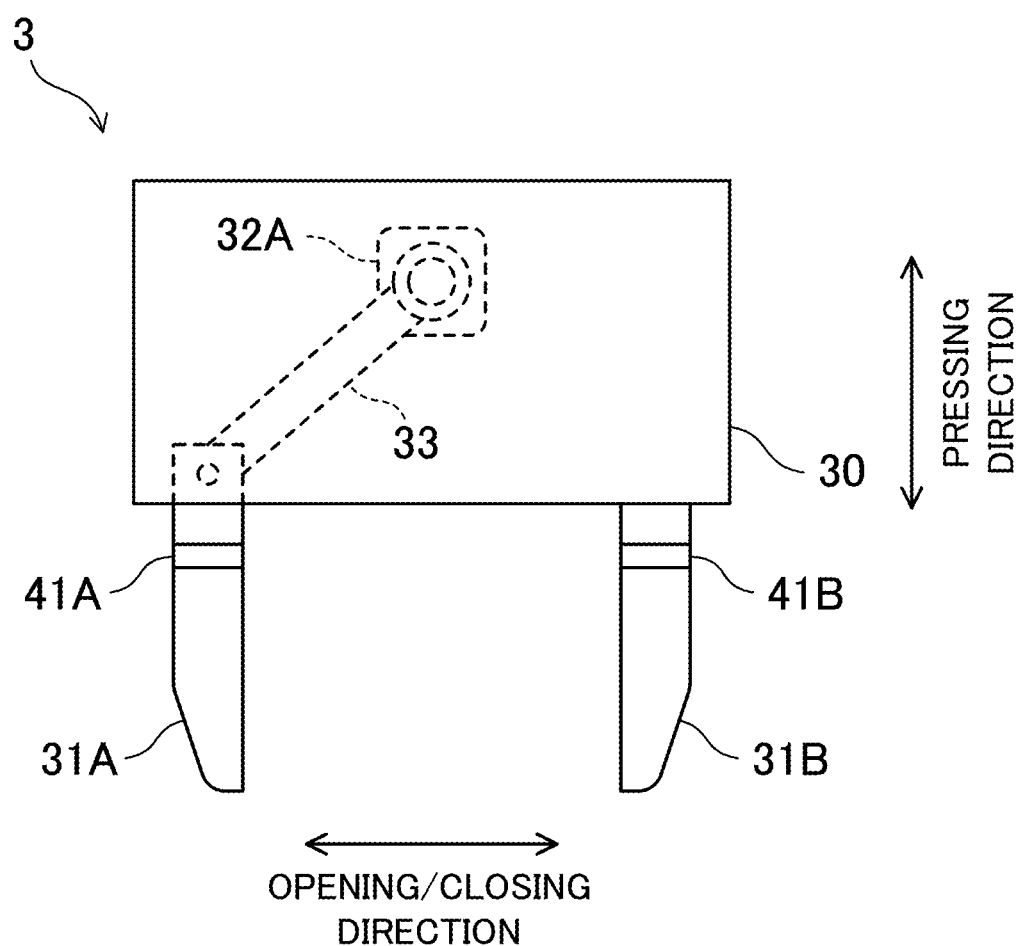
FIG. 20 is an enlarged view of a hand according to a variation.

The sensor is not limited to the force sensor 41. The sensor only needs to detect at least a force in the pressing direction. The sensor may be a current sensor a torque sensor of a motor. For example, it may be determined that a pressing force of a finger on a workpiece occurs if an applied current or a torque of the servo motor 23 in moving the hand 3 in the pressing direction is a predetermined threshold or more. Alternatively, as in the configuration in which the fingers 31 and the servo motors 32 are coupled as illustrated in FIG. 20, in a configuration in which a reaction force to the finger 31 from the workpiece W affects a torque of the servo motor 32, the pressing force of the finger 31 on the workpiece W may be determined based on the applied current or the torque of the servo motor 32. For example, if the applied current or the torque of the servo motor 32 is the predetermined threshold or more, it is determined that a pressing force of the finger 31 on the workpiece W occurs. FIG. 20 shows only the configuration of the first finger 31A and does not show the configuration of the second finger 31B.

The robot 1 may not include the imager 42. For example, as in the case where the position of a workpiece W in workpieces W is generally determined, if the position of the workpiece W is already known, the robot controller 5 may control the robot arm 2 and other components based on the known position of the workpiece W. Through the picking action described above, if the position of the workpiece W is generally known, appropriate holding of the workpiece W with the fingers 31 can be easily achieved.

Alternatively, the imager 42 may not be included in the robot arm 2. For example, the imager 42 may be included in a robot arm different from the robot arm 2. Alternatively, in a case where an object shielding the workpiece W, such as a column plate, is not present, the imager 42 may be placed at a fixed position around the workpiece W.

A device for acquiring positional information of the workpiece W is not limited to the imager 42, and may be a device such as a three-dimensional vision sensor or a stereo camera. That is, the device for acquiring positional information of the workpiece W may acquire point group data, an RGB-D image, an RGB image, a depth image, a voxel, or the like of the workpiece W.

The Z coordinate of the holding position (i.e., a position of the holding position with respect to the pressing direction) may not be previously set depending on the workpiece W. For example, in a case where the device for acquiring positional information of the workpiece W acquires three-dimensional information of the workpiece W, the Z coordinate of the holding position may be specified based on the three-dimensional information acquired by the device.

The flowchart of the picking action is merely an example. As long as the workpiece W can be appropriately held with the fingers 31, the steps in the flowchart may be changed, replaced, added, omitted, and so forth. The order of steps in the flowchart may be changed, or serial processes may be processed in parallel.

For example, in the picking action described above, the contact action of bringing the finger 31 into contact with the workpiece W in the pressing direction is performed with force control of the robot arm 2. Alternatively, the force control in step S103 may be replaced by position control of the robot arm 2, that is, the hand 3. That is, in step S103, the movement controller 55 may perform position control of the robot arm 2 such that the hand 3 moves to the holding position in the pressing direction. Then, during the position control, the movement controller 55 may monitor whether the finger 31 contacts the workpiece W or not, and if the finger 31 contacts the workpiece W, start force control of the robot arm 2.

In the picking action described above, at the positions of the fingers 31 in the opening/closing direction in performing the contact action, the distance between the fingers 31 is wider than the width of the workpiece W (dimension in the opening/closing direction). Alternatively, the distance between the fingers 31 may be narrower than the width of the workpiece W (dimension in the opening/closing direction). With this configuration, in moving the hand 3 to the holding position, the finger 31 is highly likely to contact the workpiece W, and contact of the finger 31 with workpieces W not to be held is prevented. The force control of the robot arm 2 is not limited to the admittance control. For example, the force control may be PI control in which an action instruction value of the robot arm 2 is output using a deviation between a target value and a pressing force detected by the force sensor 41 as an input.

Functions of elements disclosed herein may be performed by using a circuit or a processing circuit including a general-purpose processor, a dedicated processor, an integrated circuit, an application specific integrated circuit (ASIC) configured or programmed to perform disclosed functions, a conventional circuit, and/or a combination thereof. A processor includes a transistor and other circuits, and thus, are assumed to be a processing circuit or a circuit. In the present disclosure, a circuit, a unit, or a means is hardware that performs listed functions, or hardware programmed to perform listed functions. The hardware may be the hardware disclosed herein, or known hardware programmed or configured to perform listed functions. If the hardware is a processor considered as a type of a circuit, the circuit, the means, or the unit is a combination of hardware and software, and software is used for a configuration of hardware and/or a processor.

The techniques of the present disclosure described above are summarized as follows.

[1] A robot controller 5 includes: a movement controller 55 that moves a robot arm 2 (arm) including a hand 3; and an opening/closing controller 56 that opens and closes at least one of the fingers 31 included in the hand 3 in a predetermined opening/closing direction. The movement controller 55 causes the robot arm 2 to perform a contact action of bringing at least one of the fingers 31 into contact with a workpiece W in a pressing direction, the pressing direction intersecting with the opening/closing direction. The opening/closing controller 56 causes the at least one of the fingers 31 to perform an opening action after the contact action. After the at least one of the fingers 31 is separated from the workpiece W through the opening action, the movement controller 55 causes the robot arm 2 to perform an approaching action of moving the hand 3 in the pressing direction to a predetermined holding position at which the workpiece W is located between the fingers 31. The opening/closing controller 56 causes the fingers 3 to hold the workpiece W by causing at least one of the fingers 31 to perform a closing action in a state where the hand 3 is located at the holding position.

With this configuration, the finger 31 is caused to perform the opening action from the state where the finger 31 contacts the workpiece W to cancellation of the contact so that the state where the workpiece W is acceptable between the fingers 31 is obtained. Accordingly, the hand 3 is allowed to move in the pressing direction. As a result, the hand 3 can be appropriately moved to the holding position.

[2] In the robot controller 5 of [1], the movement controller 55 performs force control of the robot arm 2 to maintain contact between the at least one of the fingers 31 and the workpiece W during the opening action of the at least one of the fingers 31.

With this configuration, a force of the robot arm 2 is controlled during the opening action of the finger 31 so that contact of the finger 31 with the workpiece W is maintained. Accordingly, the finger 31 can be smoothly moved to the state where the workpiece W is acceptable between the fingers 31. That is, without force control, in a case where the surface of the workpiece W in contact with the finger 31 is not parallel to the opening/closing direction of the finger 31, when the finger 31 opens in the opening/closing direction, contact between the finger 31 and the workpiece W might be immediately canceled. When the contact between the finger 31 and the workpiece W is canceled, the hand 3 moves in the pressing direction. At this time, if the finger 31 is not open enough to allow the workpiece W to be acceptable between the fingers 31, immediately after the hand 3 moves to the pressing direction, the finger 31 contacts the workpiece W. Then, the opening action of the finger 31 is performed again. In this manner, in the absence of force control, the opening action of the finger 31 and the movement of the hand 3 in the pressing direction can be repeated such that the distal end of the finger 31 follows a stepped trajectory. On the other hand, in the case of performing the force control, the position of the hand 3 in the pressing direction is also adjusted during the opening action of the finger 31 such that the contact of the finger 31 with the workpiece W is maintained. Accordingly, the finger 31 smoothly moves to the state where the workpiece W is acceptable between the fingers 31.

[3] In the robot controller 5 of [1] or [2], in the force control of the robot arm 2, the movement controller 55 controls the robot arm 2 such that a pressing force of the at least one of the fingers 31 against the workpiece W in the pressing direction has a predetermined target value.

With this configuration, in the force control of the robot arm 2, the pressing force of the finger 31 against the workpiece W is adjusted to the target value. The target value may be a constant value or a variable value. The adjustment of the pressing force can prevent separation of the finger 31 from the workpiece W or excessive pressing of the finger 31 against the workpiece W during the pressing action of the finger 31 can be prevented.

[4] In the robot controller 5 of any one of [1] to [3], in the opening action of the at least one of the fingers 31, the opening/closing controller 56 determines that the at least one of the fingers 31 is separated from the workpiece W based on the pressing force of the at least one of the fingers 31 against the workpiece W.

With this configuration, when the contact between the finger 31 and the workpiece W is canceled, the pressing force becomes zero. That is, the opening/closing controller 56 can easily determine that the contact between the finger 31 and the workpiece W is canceled by monitoring the pressing force.

[5] In the robot controller 5 of any one of [1] to [4], in the opening action of the at least one of the fingers 31, the opening/closing controller 56 stops one of the fingers 31 not in contact with the workpiece W, and causes one of the fingers 31 in contact with the workpiece W to perform the opening action.

With this configuration, during the opening action of the finger 31, excessive increase in the distance between the fingers 31 can be prevented. With reference to the state of FIG. 7, for example, the opening/closing controller 56 causes only the second finger 31B in contact with the workpiece W to perform the opening action and keeps the first finger 31A not in contact with the workpiece W stopped. If the first finger 31A and the second finger 31B perform the opening action similarly, the distance between the first finger 31A and the second finger 31B excessively increases. For example, in a case where a structure such as a wall of the container 91 or another workpiece W is present in the opening direction of the first finger 31A, the first finger 31A might interfere with the structure or this workpiece W. If the first finger 31A interferes with an object, a trouble also occurs in the opening action of the second finger 31B. On the other hand, the first finger 31A not in contact with the workpiece W is kept stopped so that interference of the first finger 31A with surrounding workpieces W or other objects can be thereby prevented.

[6] A robot system 100 includes: a hand 3 including the fingers 31, each of the fingers 31 being capable of opening and closing; a robot arm 2 (arm) including the hand 3; and the robot controller of any one of [1] to [5].

With this configuration, the finger 31 is caused to perform the opening action from the state where the finger 31 contacts the workpiece W to cancelation of the contact so that the state where the workpiece W is acceptable between the fingers 31 is obtained. Accordingly, the hand 3 is allowed to move in the pressing direction. As a result, the hand 3 can be appropriately moved to the holding position.

[7] In the robot system 100 of [6], the hand 3 includes servo motors 32 (driving sources) that open and close the fingers 31 independently of each other, and the opening/closing controller 56 controls the servo motors 32 independently of each other.

With this configuration, the fingers 31 can be opened and closed independently of each other. The hand 3 and the opening/closing controller 56 configured as described above can achieve the opening action of only the finger 31 in contact with the workpiece W as described above.

[8] The robot system 100 of [6] or [7] further includes a force sensor 41 that detects a pressing force of the fingers 31 against a workpiece W.

With this configuration, based on the detection result of the force sensor 41, contact of the finger 31 with the workpiece W can be easily determined.

[9] In the robot system 100 of any one of [6] to [8], each of the fingers 31 includes the force sensor 41.

With this configuration, based on the detection result of the force sensor 41, the finger 31 in contact with the workpiece W and the finger 31 not in contact with the workpiece W can be easily distinguished.

A robot control program 54 causing a robot controller 5 (computer) to execute the functions of: causing a robot arm 2 (arm) including a hand 3 to perform a contact action of bringing at least one of fingers 3 into contact with a workpiece W in a pressing direction, the fingers 31 being included in the hand 3 and capable of being opening and closing in a predetermined opening/closing direction, the pressing direction intersecting with the opening/closing direction; causing at least one of the fingers 31 to perform an opening action after the contact action; causing the robot arm 2 to perform an approaching action of moving the hand 3 in the pressing direction to a predetermined holding position at which the workpiece W is located between the fingers 31, after the at least one of the fingers 31 is separated from the workpiece W through the opening action; and causing the at least one of the fingers 31 to perform a closing action in a state where the hand 3 is at the holding position to thereby cause the fingers 31 to hold the workpiece W.

With this configuration, the finger 31 is caused to perform the opening action from the state where the finger 31 contacts the workpiece W to cancelation of the contact so that the state where the workpiece W enters between the fingers 31 is obtained. Accordingly, the hand 3 is allowed to move in the pressing direction. As a result, the hand 3 can be appropriately moved to the holding position.

The invention claimed is:
1. A robot controller comprising:
a movement controller that moves an arm including a hand; and
an opening/closing controller that opens and closes at least one of fingers included in the hand in a predetermined opening/closing direction, wherein
the movement controller causes the arm to perform a contact action of bringing at least one of the fingers into contact with a workpiece in a pressing direction, the pressing direction intersecting with the opening/closing direction,
the opening/closing controller causes the at least one of the fingers to perform an opening action after the contact action,
after the at least one of the fingers is separated from the workpiece through the opening action, the movement controller causes the arm to perform an approaching action of moving the hand in the pressing direction to a predetermined holding position at which the workpiece is located between the fingers, and
the opening/closing controller causes the fingers to hold the workpiece by causing at least one of the fingers to perform a closing action in a state where the hand is located at the holding position.

2. The robot controller according to claim 1, wherein the movement controller performs force control of the arm to maintain contact between the at least one of the fingers and the workpiece during the opening action of the at least one of the fingers.

3. The robot controller according to claim 2, wherein in the force control, the movement controller controls the arm such that a pressing force of the at least one of the fingers against the workpiece in the pressing direction has a predetermined target value.

4. The robot controller according to claim 3, wherein in the opening action of the at least one of the fingers, the opening/closing controller determines that the at least one of the fingers is separated from the workpiece based on the pressing force of the at least one of the fingers against the workpiece.

5. The robot controller according to claim 1, wherein in the opening action of the at least one of the fingers, the opening/closing controller stops one of the fingers not in contact with the workpiece, and causes one of the fingers in contact with the workpiece to perform the opening action.

6. A robot system comprising:
a hand including fingers, each of the fingers being capable of opening and closing;
an arm including the hand; and
and the robot controller according to claim 1.

7. The robot system according to claim 6, wherein the hand includes driving sources that open and close the fingers independently of each other, and
the opening/closing controller controls the driving sources independently of each other.

8. The robot system according to claim 6, further comprising
a sensor that detects a pressing force of the fingers against a workpiece.

9. The robot system according to claim 8, wherein each of the fingers includes the sensor.

10. A non-transitory storage medium storing robot control program causing a computer to execute the functions of:
causing an arm including a hand to perform a contact action of bringing at least one of fingers into contact with a workpiece in a pressing direction, the fingers being included in the hand and capable of opening and closing in a predetermined opening/closing direction, the pressing direction intersecting with the opening/closing direction;

causing at least one of the fingers to perform an opening action after the contact action;

causing the arm to perform an approaching action of moving the hand in the pressing direction to a predetermined holding position at which the workpiece is located between the fingers, after the at least one of the fingers is separated from the workpiece through the opening action; and causing the at least one of the fingers to perform a closing operation in a state where the hand is at the holding position to thereby cause the fingers to hold the workpiece.

* * * * *